(12) United States Patent
Chiang (10) Patent No.: US 12,495,807 B2
(45) Date of Patent: Dec. 16, 2025

(54) MICRO-VIBRATION WAVE GENERATING DEVICE

(71) Applicant: PIN CHIA AN TECHNOLOGY CO., LTD., Taipei (TW)

(72) Inventor: Yung-Hsiung Chiang, Taipei (TW)

(73) Assignee: PIN CHIA AN TECHNOLOGY CO., LTD., Taipei (TW)

( * ) Notice: Subject to any disclaimer, the term of this patent is extended or adjusted under 35 U.S.C. 154(b) by 977 days.

(21) Appl. No.: 17/671,786

(22) Filed: Feb. 15, 2022

(65) Prior Publication Data

US 2023/0100057 A1   Mar. 30, 2023

(30) Foreign Application Priority Data

Sep. 29, 2021   (CN) ............................ 202111147938.2

(51) Int. Cl.
*A23B 2/10* (2025.01)
*A23B 2/00* (2025.01)
*B06B 1/02* (2006.01)

(52) U.S. Cl.
CPC ............... *A23B 2/10* (2025.01); *A23B 2/001* (2025.01); *B06B 1/0207* (2013.01); *A23V 2002/00* (2013.01)

(58) Field of Classification Search
CPC ......... A23B 2/10; A23B 2/001; B06B 1/0207; A23V 2002/00
USPC ........ 219/110, 241, 485, 488–491, 494, 497, 219/501, 510; 99/336
See application file for complete search history.

(56) References Cited

U.S. PATENT DOCUMENTS

| 5,841,617 A * | 11/1998 | Watkins, Jr. ........... H02H 5/043 |
| | | 219/494 |
| 8,207,479 B2 | 6/2012 | Ben-Shmuel et al. |
| 8,319,159 B2 | 11/2012 | Ceraso |
| 8,759,729 B2 | 6/2014 | Ben-Shmuel et al. |
| 8,941,040 B2 | 1/2015 | Ben-Shmuel et al. |

(Continued)

FOREIGN PATENT DOCUMENTS

| CN | 1281133 A | 1/2001 |
| CN | 111578595 A | 8/2020 |
| CN | 213480694 U | 6/2021 |

(Continued)

*Primary Examiner* — Phuong T Nguyen
(74) *Attorney, Agent, or Firm* — Best & Flanagan LLP (57) ABSTRACT

A micro-vibration wave generating device includes: a power indicator circuit, a first transformer micro-vibration wave generating circuit, and a receptor. An input end of the power indicator circuit is connected to the power source; an input end of the first transformer micro-vibration wave generating circuit is connected with an output end of the power indicator circuit; the receptor is connected with an output end of the first transformer micro-vibration wave generating circuit. Micro-vibration waves generated by the transformer micro-vibration wave generating circuit can resonate with the water molecules in the food, and thereby the water molecules form soft and non-spiky crystals of water molecules when they are frozen, which greatly reduces the damage to the food cells. Accordingly, the quality of the food is intact without mixing odors. The present invention can also be used in cooking deep fried food with almost no oil smoke produced.

3 Claims, 6 Drawing Sheets

(56) References Cited

U.S. PATENT DOCUMENTS 9,040,883 B2   5/2015  Ben-Shmuel et al.
9,078,298 B2   7/2015  Ben-Shmuel et al.

FOREIGN PATENT DOCUMENTS

| | | |
|---|---|---|
| JP | 2002329574 A | 11/2002 |
| JP | 2004008041 A | 1/2004 |
| JP | 3220186 U | 2/2019 |
| JP | 2020078545 A | 5/2020 |
| TW | 200731836 A | 8/2007 |
| TW | 200803633 A | 1/2008 |
| TW | 201338386 A | 9/2013 |
| WO | WO2019167226 A1 | 9/2019 |

* cited by examiner

MICRO-VIBRATION WAVE GENERATING DEVICE

BACKGROUND OF THE INVENTION

1. Field of the Invention

The present invention relates to the technical field of micro-vibration wave, in particular, to a micro-vibration wave generating device.

2. Description of the Related Art

Due to the high water content in foods such as vegetables and meat, they are easily affected by microorganism pollution and other environmental factors during processing, transportation, storage and sales. As the affected foods become stale and discolored, they then lose their edibility and commodity values. Nowadays, the most popular method of food preservation is refrigeration. However, the freezing of food will cause the water contained in the food to form spiky ice crystals of water molecules, and the ice crystals will damage the cells of the food and degrade the quality of the food; moreover, odor mixing among food ingredients is likely to happen.

SUMMARY OF THE INVENTION

In order to solve the above problems, the purpose of the embodiments of the present invention is to provide a micro-vibration wave generating device, thereby solving the problems that the refrigeration method easily damages the cells of the food and degrades the quality of the food.

A micro-vibration wave generating device includes:
a power indicator circuit, an input end of the power indicator circuit connected to a power source;
a first transformer micro-vibration wave generating circuit, an input end of the first transformer micro-vibration wave generating circuit connected with an output end of the power indicator circuit;
a receptor, connected with an output end of the first transformer micro-vibration wave generating circuit.
Preferably, the power indicator circuit includes:
a power switch, one end of the power switch connected to one end of the power source;
a power indicating lamp, one end of the power indicating lamp connected with the other end of the power switch, and the other end of the power indicating lamp connected to the other end of the power source.
Preferably, the power indicator circuit further includes:
a fuse, one end of the fuse connected to the other end of the power source, and the other end of the fuse connected with the other end of the power indicating lamp.
Preferably, the first transformer micro-vibration wave generating circuit includes:
a first step-up transformer, an input end of the first step-up transformer connected with the output end of the power indicator circuit;
a first resistor, one end of the first resistor connected with one end of a secondary side of the first step-up transformer, and the other end of the first resistor connected with the receptor.
Preferably, the receptor is a metal column or a metal sheet.
The present invention also provides a micro-vibration wave generating device which includes:
a power indicator circuit, an input end of the power indicator circuit connected to a power source;
a filter circuit, an input end of the filter circuit connected with an output end of the power indicator circuit;
a second transformer micro-vibration wave generating circuit, an input end of the second transformer micro-vibration wave generating circuit connected with an output end of the filter circuit;
a receptor, connected with an output end of the second transformer micro-vibration wave generating circuit.
Preferably, the power indicator circuit includes:
a power switch, one end of the power switch connected to one end of the power source;
a power indicating lamp, one end of the power indicating lamp connected with the other end of the power switch;
a fuse, one end of the fuse connected with the other end of the power indicating lamp, and the other end of the fuse connected to the other end of the power source.
Preferably, the filter circuit includes:
a first capacitor, one end of the first capacitor connected with one end of the power indicating lamp, and the other end of the first capacitor connected with the other end of the power indicating lamp,
a filter, a first end of the filter connected with one end of the first capacitor, and a second end of the filter connected with the other end of the first capacitor;
a second capacitor, one end of the second capacitor connected with a third end of the filter, and the other end of the second capacitor connected with a fourth end of the filter.
Preferably, the second transformer micro-vibration wave generating circuit includes:
a second step-up transformer, an input end of the second step-up transformer connected with the second capacitor, and one end of a secondary side of the second step-up transformer connected with the receptor;
a second resistor, one end of the second resistor connected with one end of the second capacitor, and the other end of the second resistor connected with the other end of the secondary side of the second step-up transformer.

The beneficial effects of the micro-vibration wave generating device provided by the present invention is that, compared with the prior art, the micro-vibration wave generating device provided by the present invention includes: a power indicator circuit, a first transformer micro-vibration wave generating circuit, and a receptor, wherein the input end of the power indicator circuit is connected to the power source, and the input end of the first transformer micro-vibration wave generating circuit is connected with the output end of the power indicator circuit, and the receptor is connected with the output end of the first transformer micro-vibration wave generating circuit.

In the present invention, the micro-vibration wave generated by the transformer micro-vibration wave generating circuit can generate resonance with the water molecules in the food, so that the water molecules can form soft, non-spiky crystals of water molecules when frozen, which greatly reduces the damage to food cells. Thereby, the quality of the food remains intact without mixing odors. In addition, the present invention can also be used in the cooking of fried food. Through the resonance between the micro-vibration wave and the water molecules in the food ingredients, the water molecules are heated and evaporated before the oil gets emulsified, so that almost no oil smoke is produced during a deep frying process.

In order to make the above-mentioned objects, features and advantages of the present invention more obvious and easier to understand, preferred embodiments are given below, and are described in detail as follows in conjunction with the accompanying drawings.

In order to explain the embodiments of the present invention or the technical solutions in the prior art more clearly, the following briefly introduces the accompanying drawings needed for the description of the embodiments or the prior art. Obviously, the accompanying drawings in the following description are only some embodiments of the present invention. For those of ordinary skill in the art, other drawings can also be obtained according to these drawings without creative efforts.

BRIEF DESCRIPTION OF THE DRAWINGS

FIGS. 2A-2C show comparison diagrams of water molecule crystallization provided by the present invention, wherein

FIGS. 3A, 3B show comparison diagrams of tofu thawing provided by the present invention, wherein

FIGS. 4A-4D show test charts of weights of the blood water contents coming out from pork provided by the present invention, wherein

DETAILED DESCRIPTION OF THE INVENTION

In the description of the present invention, it should be understood that the terms "center", "longitudinal", "lateral", "length", "width", "thickness", "upper", "lower", "front", "rear", "left", "right", "vertical", "horizontal", "top", "bottom", "inside", "outside", "clockwise", "counterclockwise", etc. indicate orientation or positional relationship which is based on the orientation or positional relationship shown in the drawings, and are only for the convenience of describing the present invention and simplifying the description, rather than indicating or implying that the device or element referred to must have a particular orientation and be constructed and operated in a particular orientation, and therefore, they should not be construed as limitations of the present invention.

In addition, the terms "first" and "second" are only used for descriptive purposes, and should not be construed as indicating or implying relative importance or implying the number of indicated technical features. Thus, a feature defined as "first" or "second" may expressly or implicitly include one or more of that feature. In the description of the present invention, "plurality" means two or more, unless otherwise expressly and specifically defined.

In the present invention, unless otherwise expressly specified and limited, the terms "installed", "interconnected", "connected", "fixed" and other terms should be understood in a broad sense, for example, it may be a fixed connection or a detachable connection, or integrally connected; it can be a mechanical connection or an electrical connection; it can be a direct connection, or an indirect connection through an intermediate medium, or the internal communication between the two components. For those of ordinary skill in the art, the specific meanings of the above terms in the present invention can be understood according to specific situations.

In order to solve the problem of over frying food in nowadays frying pans, the purpose of the embodiments of the present invention is to provide a micro-vibration wave generating device.

Embodiment I

Figure 1:
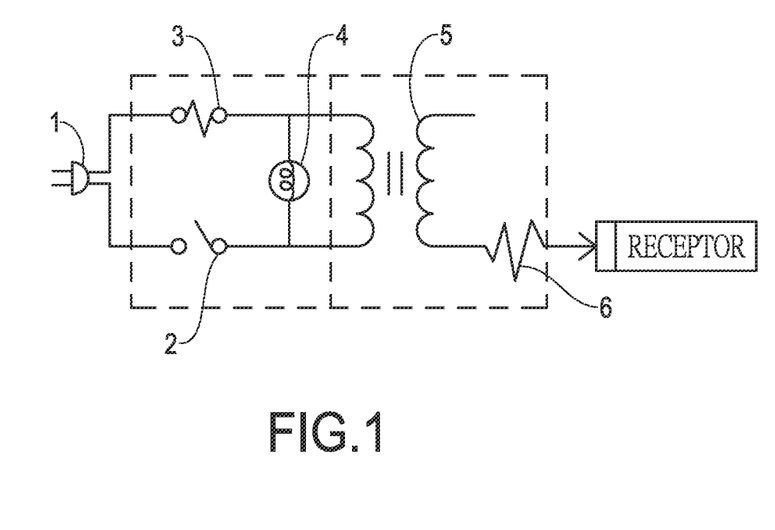
FIG. 1 shows a circuit diagram of a micro-vibration wave generating device of embodiment 1 of the present invention.

Please refer to FIG. 1. A micro-vibration wave generating device includes: a power indicator circuit, a first transformer micro-vibration wave generating circuit, and a receptor.

An input end of the power indicator circuit is connected to the power source 1; an input end of the first transformer micro-vibration wave generating circuit is connected with the output end of the power indicator circuit. In the present invention, the first transformer micro-vibration wave generating circuit is used to generate the micro-vibration wave; the receptor is connected with an output end of the first transformer micro-vibration wave generating circuit.

As another specific embodiment of the present invention, the power indicator circuit includes: a power switch 2, a power indicating lamp 4 and a fuse 3.

One end of the power switch 2 is connected to one end of the power source 1; one end of the power indicating lamp 4 is connected with the other end of the power switch 2, and the other end of the power indicating lamp 4 is connected to the other end of the power source 1. One end of the fuse 3 is connected to the other end of the power source 1, and the other end of the fuse 3 is connected with the other end of the power indicating lamp 4. In the present invention, by connecting the fuse 3 in series on one side of the power source 1, when a fault or abnormality occurs in the circuit, it can fuse itself to cut off the current, thereby ensuring the safe operation of the circuit.

As another embodiment of the present invention, the first transformer micro-vibration wave generating circuit includes: a first step-up transformer 5 and a first resistor 6.

An input end of the first step-up transformer 5 is connected with the output end of the power indicating circuit; one end of the first resistor 6 is connected with one end of the secondary side of the first step-up transformer 5, and the other end of the first resistor 6 is connected with the receptor.

When the alternating current (AC) power source 1 is converted to a rated voltage (0.5 KV~2.5 KV) through the first step-up transformer 5, sine waves, magnetic lines of force and magnetic fields are generated when the winding of the transformer and the iron core are in mutual inductive actions. When a conductive device, i.e. the receptor, is connected with the secondary side of the first step-up transformer 5, sine waves form a magnetic field around the receptor perimeter, and the receptor generates a tangible micro-vibration wave through magnetic vibration effects, and the frequency of the micro-vibration wave is 100-120 Hz.

As another embodiment of the present invention, the receptor is a metal column or a metal sheet, and the metal can be iron, copper, silver or stainless steel, etc. The reachable distance of the micro-vibration wave depends on the material of the receptor and the rated voltage. Generally, when the rated voltage is larger, the reachable distance of the micro-vibration wave is also farther. In practical applications, the receptor can be installed in a refrigerator or a cold closet.

Figure 2A:
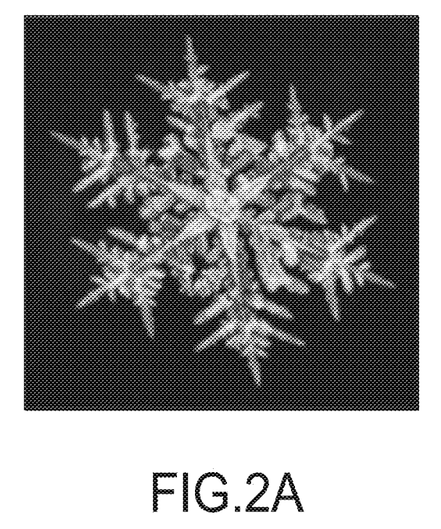
FIG. 2A represents an ice crystal structure of water molecules under normal freezing conditions.
Figure 2B:
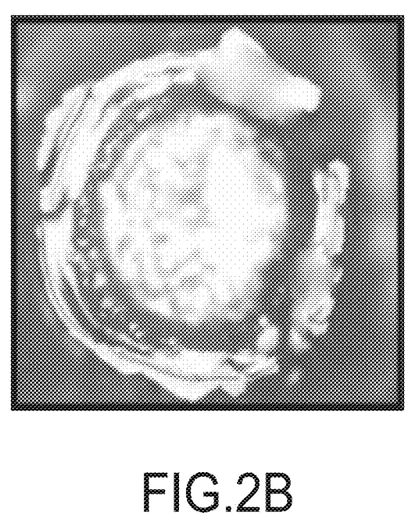
FIG. 2B is a proportionally magnified view of one ice crystal structure of water molecules in FIG. 2C.
Figure 2C:
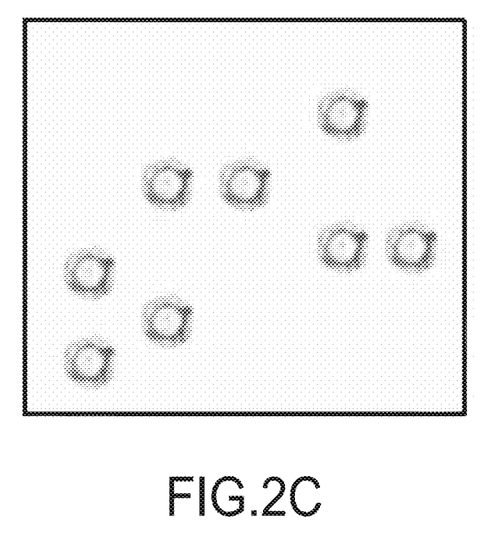
FIG. 2C represents the ice crystal structures of water molecules under micro-vibration wave resonance.

Please refer to FIGS. 2A-2C. When water molecules are frozen, spiky water molecule crystals appear, and the spiky water molecule crystals can easily puncture the cell walls or cell membranes of the food, resulting in the deterioration of the quality of the food and the problem of odor mixing among the food ingredients. The present invention applies micro-vibration waves to the water molecule through the receptor to generate resonance, therefore the water molecules do not freeze at 0 to −4° C., and when the temperature drops below −5° C., due to supercooling, water molecules quickly freeze to form soft, non-spiky crystals of water molecules (the size of the crystal is 1/100 of that of an ordinary ice crystal), which solves the problem of ice crystals damaging food cells during the freezing process, and keeps the quality of the food almost intact without odor mixing.

The principle of traditional rapid freezing is to freeze the food at ultra-low temperature (−50° C.), and the purpose of which is to allow water molecules to quickly go through the freezing temperature zone (0 to −4° C.), so as to reduce the damage to the food by ice crystals through reducing the freezing time. Therefore, the lower the temperature of the rapid freezing, the shorter the time it takes to go through the freezing temperature zone, and the less damage caused by freezing food. The present invention, through the resonance of the micro-vibration wave and the water molecules in the food, not only prevents water molecules from freezing at 0 to −4° C., but also improves the thermal conductivity of frozen food, so that the food from inside out is frozen at the same time. Therefore, the present invention can freeze the food at −20° C., and achieve better frozen food quality than that of the rapid freezing, and thereby avoids the costs of high energy consumption of refrigeration required by the traditional rapid freezing.

Figure 3A:
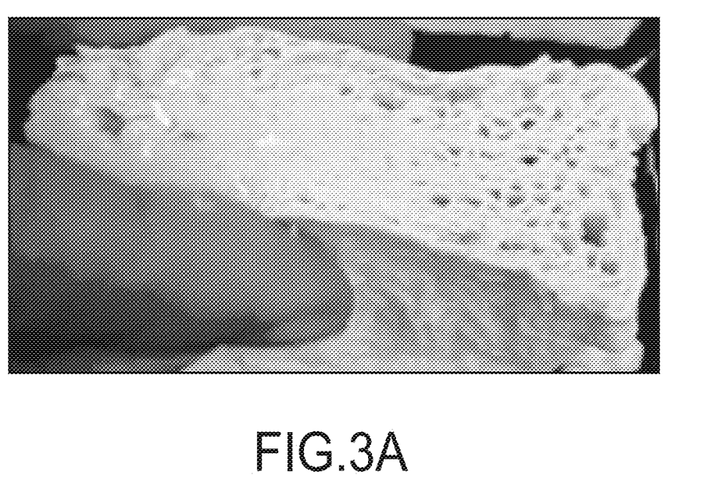
FIG. 3A represents the state of the tofu after thawing without the participation of the micro-vibration waves.
Figure 3B:
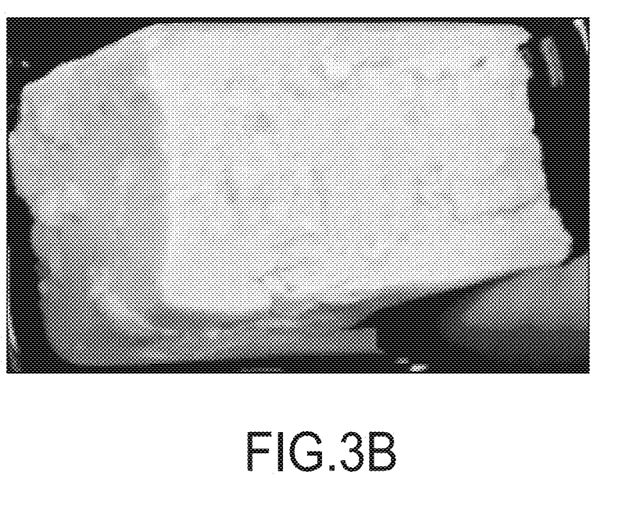
FIG. 3B represents the state of the tofu after thawing with the participation of the micro-vibration waves.
Figure 4A:
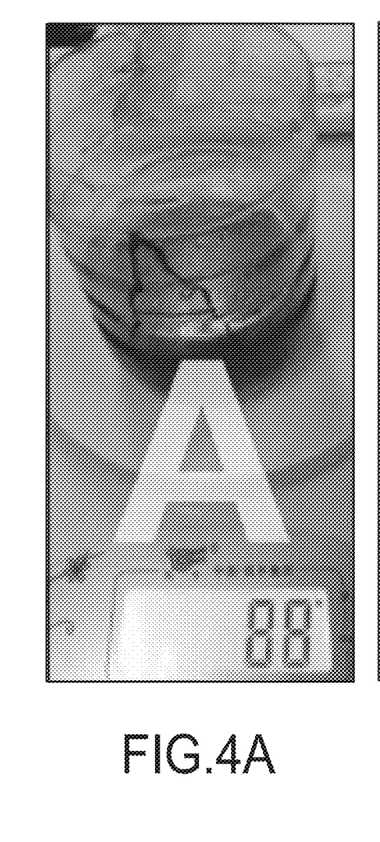
FIG. 4A represents a weight of the blood water content coming out from 7750 g pork after freezing and then thawing all under the participation of micro-vibration waves.
Figure 4B:
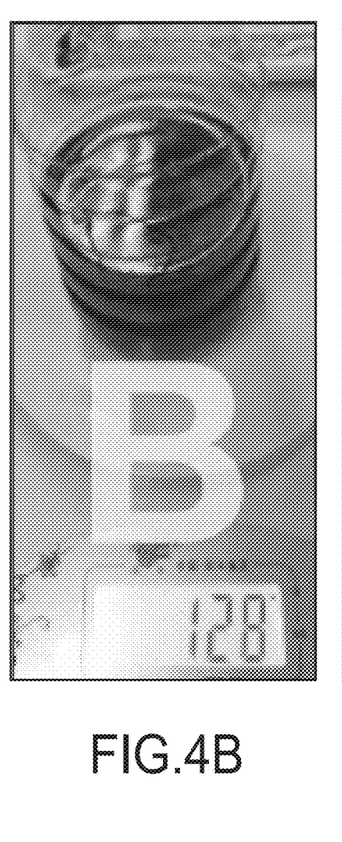
FIG. 4B represents a weight of the blood water content coming out from 4820 g pork after freezing under the participation of micro-vibration waves and then thawing in normal condition.
Figure 4C:
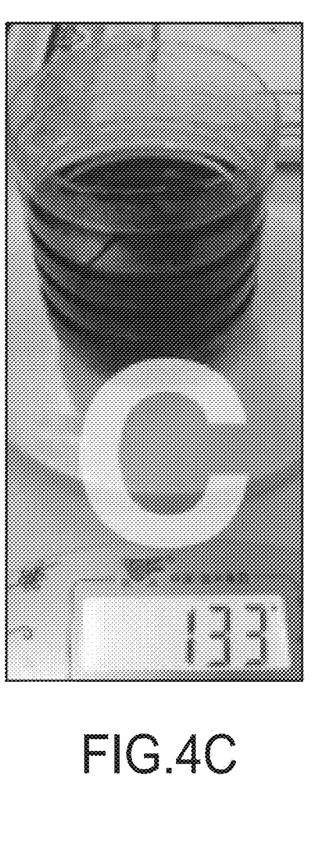
FIG. 4C represents a weight of the blood water content coming out from 6250 g pork after freezing in normal condition and then thawing under the participation of micro-vibration waves.
Figure 4D:
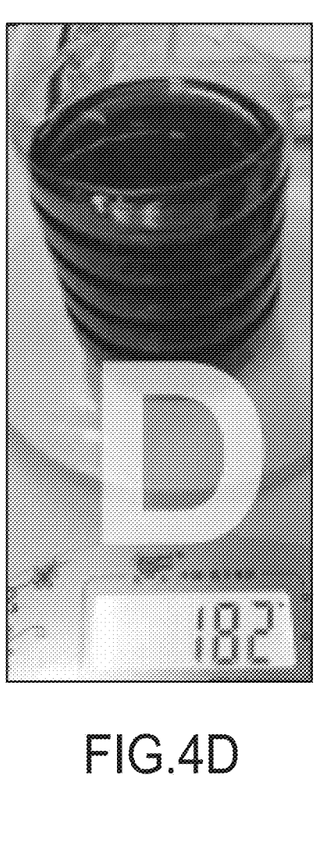
FIG. 4D represents a weight of the blood water coming out from 4630 g pork after freezing and then thawing all in normal condition.

Please refer to FIGS. 3A-3B and FIGS. 4A-4D together. In FIG. 3A, it can be seen that the structure of the tofu that has been frozen and thawed is damaged and appears as a frozen tofu, while, in FIG. 3B, with the participation of the micro-vibration waves, the frozen and thawed tofu still appears as a soft tofu. It can be seen from FIGS. 4A-4D that a weight of the blood water content coming out from 7750 g pork in FIG. 4A is 88 g, a weight of the blood water content coming out from 4820 g pork in FIG. 4B is 128 g, a weight of the blood water content coming out from 6250 g pork in FIG. 4C is 133 g, and a weight of the blood water content coming out from 4630 g pork in FIG. 4D is 182 g. As it can be seen from the above-mentioned, a normal thawing process starts from the outside of the food, and it takes a long time for the food to completely thaw. Therefore, during the normal thawing process, after the cells located on the outside become softened, the softened cells are squeezed by the still spiky ice crystals inside, thereby destroying the structure of the food. The micro-vibration wave generating device applies micro-vibration waves to the water molecules to generate resonance, which makes it difficult for the water molecules to agglomerate, so that soft, non-spiky crystals of water molecules are produced instead; moreover, the inside and the outside of the food ingredients can thaw simultaneously, which not only reduces the thawing time, but also solves the problem of food damaging during thawing.

Table 1 shows the quantity of bacteria when refrigerating Yoshinoya® lunch boxes using normal refrigerators and the micro-vibration wave refrigerators equipped with the receptor of the present invention. It can be seen from Table 1 that the present invention can also vibrate the water molecules in bacteria, and such vibration strongly inhibits the reproduction of bacteria, especially for newly reproduced bacteria, and thereby improves the preservation of food further. In addition, the receptor of the present invention can also emit a small amount of electrons, and induce ionization and peroxide to destroy the structures of proteins, nucleic acids and enzymes of the microorganism, which serve as germicidal actions to a certain degree.

TABLE 1

| Refrigeration conditions | Bacteria count | | | |
| --- | --- | --- | --- | --- |
| | 1st day | 3rd day | 5th day | 7th day |
| Normal refrigerator(5° C.) | 24000 | 590000 | 420000000 | 3100000000 |
| Micro-vibration wave Refrigerator(5° C.) | 24000 | 9800 | 22000 | 74000 |
| Micro-vibration wave Refrigerator(2° C.) | 24000 | 13000 | 18000 | 35000 |
| Micro-vibration wave Refrigerator(−2° C.) | 24000 | 9300 | 16000 | 32000 |

Figure 5:
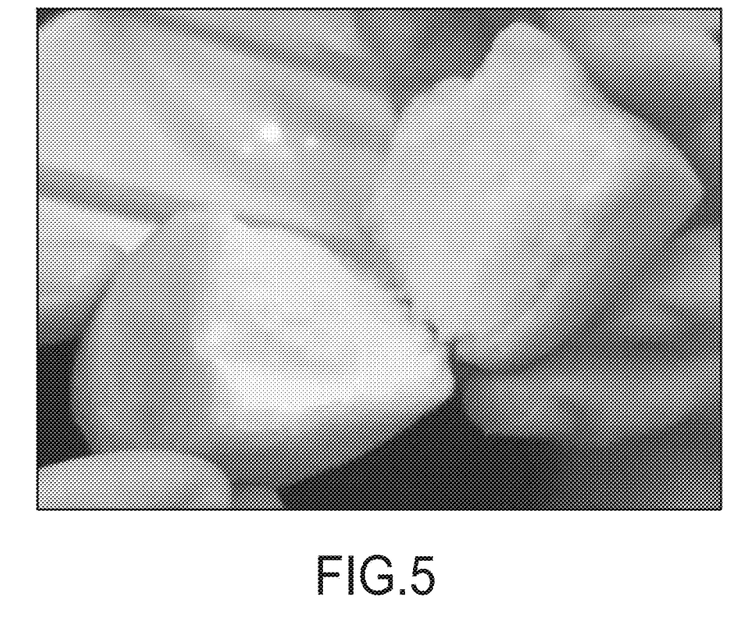
FIG. 5 shows a diagram of fried food under the participation of micro-vibration waves provided by the present invention.

Please refer to FIG. 5. During the frying process, the present invention generates resonance with the water molecules in the food through the micro-vibration wave, so that the boiling temperature of the water molecules in the food can be lower than 100° C., thus the evaporation of the water molecules is enhanced, and the water molecules contained in the food are much less likely to flow into the frying pan to cause emulsification with the oil, thereby greatly reducing the production of oil smoke and keeping the oil clear and clean to prolong the service lifetime of the oil for frying. In addition, since the present invention can also improve the thermal conductivity of the food, lowering the oil temperature by about 5° C. can still sustain the water in the food to steam the food, and thereby the frying time is shortened, the oil absorption of the food is reduced, and the nutrients of the food are intact to the greatest extent. And the probability of producing acrylamide, which is known as a carcinogen, can be reduced for deep frying at high temperature.

Embodiment II

Figure 6:
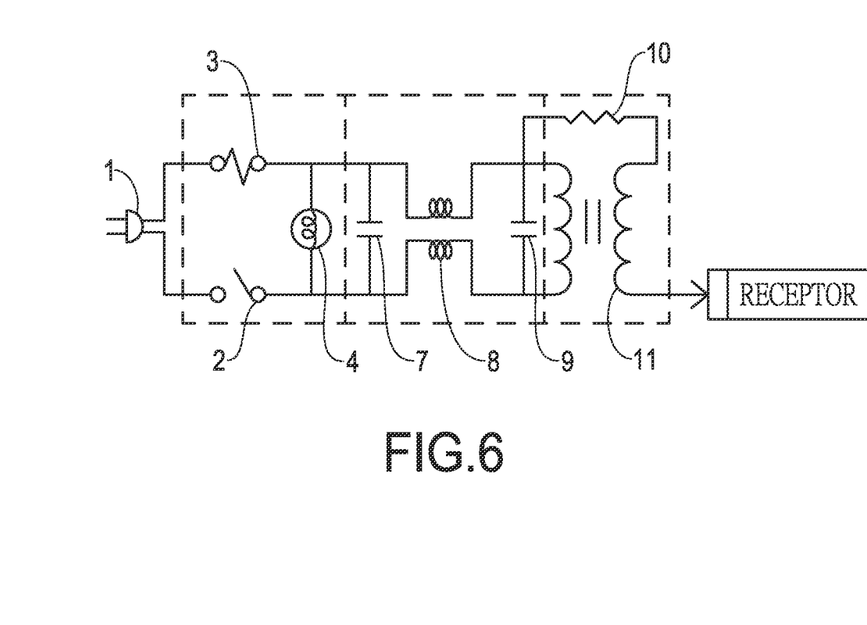
FIG. 6 shows a circuit diagram of a micro-vibration wave generating device according to embodiment 2 of the present invention.

Referring to FIG. 6, the present invention also provides a micro-vibration wave generating device which includes: a power indicator circuit, a filter circuit, a second transformer micro-vibration wave generating circuit, and a receptor.

An input end of the power indicator circuit is connected to the power source 1; an input end of the filter circuit is connected with an output end of the power indicator circuit; an input end of the second transformer micro-vibration wave generating circuit is connected with an output end of the filter circuit; the receptor is connected with an output end of the second transformer micro-vibration wave generating circuit.

As another embodiment of the present invention, the power indicator circuit includes: a power switch 2, a power indicating lamp 4 and a fuse 3.

One end of the power switch 2 is connected to one end of the power source 1; one end of the power indicating lamp 4 is connected with the other end of the power switch 2; one end of the fuse 3 is connected with the other end of the power indicating lamp 4, and the other end of the fuse 3 is connected to the other end of the power source 1. In the present invention, by connecting the fuse 3 in series on one side of the power source 1, when a fault or abnormality occurs in the circuit, it can fuse itself to cut off the current, so as to ensure the safe operation of the circuit.

As another embodiment of the present invention, the filter circuit includes: a first capacitor 7, a filter 8 and a second capacitor 9.

One end of the first capacitor 7 is connected with one end of the power indicating lamp 4, the other end of the first capacitor 7 is connected with the other end of the power indicating lamp 4; a first end of the filter 8 is connected with one end of the first capacitor 7, and a second end of the filter 8 is connected with the other end of the first capacitor 7; one end of the second capacitor 9 is connected with a third end of the filter 8, and the other end of the second capacitor 9 is connected with a fourth end of the filter 8. The invention is able to filter and reduce the harmonics generated in the alternating current by using the filter circuit, so the voltage is more stable.

As another embodiment of the present invention, the second transformer micro-vibration wave generating circuit includes: a second step-up transformer and a second resistor 10.

An input end of the second step-up transformer 11 is connected with the second capacitor 9, one end of a secondary side of the second step-up transformer 11 is connected with the receptor; one end of the second resistor 10 is connected with one end of the second capacitor 9, and the other end of the second resistor 10 is connected with the other end of the secondary side of the second step-up transformer 11. When the AC power source 1 is converted to a rated voltage (2 KV~5.8 KV) through the second step-up transformer 11, due to the mutual inductive actions between the transformer winding and the iron core, sine waves, magnetic lines of force and magnetic fields are generated. When a secondary side of the second step-up transformer 11 is connected with a conductive device, i.e. the receptor, the sine waves form a magnetic field around the receptor perimeter, and through magnetic vibration effects, the receptor generates tangible micro-vibration waves, and the frequency of the micro-vibration waves is 100-120 Hz.

As another embodiment of the present invention, the receptor is a metal column or a metal sheet, and the metal can be iron, copper, silver or stainless steel, etc. The reachable distance of the micro-vibration wave depends on the material of the receptor and the rated voltage. The micro-vibration wave generating device in the embodiment II of the present invention is suitable for a rated voltage range of 2 KV~5.8 KV, and the current is below a safe value of 0.2 mA.

In practical applications, the receptor can be installed in a deep fryer or a cold closet. The invention makes use of the micro-vibration waves generated by the transformer to resonate the water molecules in the food, so that the internal temperature and the surface temperature of the food are uniform; the water in the food is evaporated first, thereby inhibiting the emulsification of oil and water, and prolonging the service lifetime of the oil and lowering the acid value. Since the heat conduction is synchronized inside and outside of the food, the oil absorption of the food is reduced by 50%, and the frying time is shortened by 15%. The invention can still retain the rich fiber nutrients of the vegetables when the vegetables are fried, so that the cores of the vegetables are almost free of oil. In addition, since starch tends to generate acrylamide after being fried at high temperature, the present invention can also significantly reduce the probability of generating acrylamide which is known as a carcinogen. In addition, according to the present invention, the receptor can also be installed in a cold closet or a refrigerator, and the micro-vibration wave vibrates the water molecules in the food to change the shape and the size, and in the freezing environment, ruptures of the cell membranes of the food are less likely to happen, so that the freshness of the food can be preserved.

A micro-vibration wave generating device provided by the present invention includes: a power indicator circuit, a filter circuit, a second transformer micro-vibration wave generating circuit, and a receptor. An input end of the power indicator circuit is connected to the power source; an input end of the filter circuit is connected with an output end of the power indicator circuit; an input end of the second transformer micro-vibration wave generating circuit is connected with an output end of the filter circuit; the receptor is connected with an output end of the second transformer micro-vibration wave generating circuit. The invention makes use of the micro-vibration wave generated by the transformer to resonate the water molecules in the food, so that the internal temperature and the surface temperature of the food are uniform; the water in the food is evaporated first, thereby inhibiting the emulsification of oil and water; accordingly, the oil absorption of the food is reduced by 50%, and the frying time is shortened by 15%. In addition, according to the present invention, the receptor can also be installed in a cold closet or a refrigerator, with the micro-vibration wave vibrates the water molecules in the food to make the ruptures of the cell membranes of the food less likely to happen, thereby preserving the freshness of the food.

The above are only specific embodiments of the present invention, but the protection scope of the present invention is not limited to this. Any person skilled in the art who is familiar with the technical field disclosed in the present invention can easily think of changes or alternative technologies. All solutions should be covered within the protection scope of the present invention.

Therefore, the protection scope of the present invention should be based on the protection scope of the claims.

What is claimed is:
1. A micro-vibration wave generating device including:
   a power indicator circuit, an input end of the power indicator circuit connected to a power source;
   a filter circuit, an input end of the filter circuit connected with an output end of the power indicator circuit;
   a second transformer micro-vibration wave generating circuit, an input end of the second transformer micro-vibration wave generating circuit connected with an output end of the filter circuit; and
   a receptor, connected with an output end of the second transformer micro-vibration wave generating circuit:
   wherein the power indicator circuit includes:

a power switch, one end of the power switch connected to one end of the power source;

a power indicating lamp, one end of the power indicating lamp connected with the other end of the power switch; and a fuse, one end of the fuse connected with the other end of the power indicating lamp, and the other end of the fuse connected to the other end of the power source.

2. The micro-vibration wave generating device as claimed in claim 1, wherein the filter circuit includes:

a first capacitor, one end of the first capacitor connected with one end of the power indicating lamp, and the other end of the first capacitor connected with the other end of the power indicating lamp;

a filter, a first end of the filter connected with one end of the first capacitor, and a second end of the filter connected with the other end of the first capacitor; and a second capacitor, one end of the second capacitor connected with a third end of the filter, and the other end of the second capacitor connected with a fourth end of the filter.

3. The micro-vibration wave generating device as claimed in claim 2, wherein the second transformer micro-vibration wave generating circuit includes:

a second step-up transformer, an input end of the second step-up transformer connected with the second capacitor, and one end of a secondary side of the second step-up transformer connected with the receptor; and a second resistor, one end of the second resistor connected with one end of the second capacitor, and the other end of the second resistor connected with the other end of the secondary side of the second step-up transformer.

\* \* \* \* \*